(12) United States Patent
Voeller

(10) Patent No.: US 7,808,627 B2
(45) Date of Patent: Oct. 5, 2010

(54) METHOD FOR DIRECTING A CONTROLLED MOVEMENT OF A VEHICLE COMPONENT

(75) Inventor: David A. Voeller, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 708 days.

(21) Appl. No.: 11/552,605

(22) Filed: Oct. 25, 2006

(65) Prior Publication Data

US 2007/0095122 A1    May 3, 2007

Related U.S. Application Data

(60) Provisional application No. 60/731,752, filed on Oct. 31, 2005.

(51) Int. Cl.
*G01B 11/26* (2006.01)
(52) U.S. Cl. .................... 356/139.09; 356/155
(58) Field of Classification Search ............ 701/29; 356/9, 139, 155; 73/66
See application file for complete search history.

(56) References Cited

U.S. PATENT DOCUMENTS

| 5,052,111 A | * | 10/1991 | Carter et al. | ............. 33/203.18 |
| 5,748,301 A | * | 5/1998 | Muller et al. | ............... 356/155 |
| 2005/0073435 A1 | * | 4/2005 | Voeller et al. | ............... 340/933 |
| 2006/0064275 A1 | * | 3/2006 | Phillips, III | ................ 702/154 |

* cited by examiner

*Primary Examiner*—Mark Hellner
*Assistant Examiner*—Helal A Algahaim
(74) *Attorney, Agent, or Firm*—Polster, Lieder, Woodruff & Lucchesi, L.C.

(57) ABSTRACT

Methods for facilitating controlled movement of at least one vehicle wheel. The methods include the step of presenting a display of information, such as by visual display or audible signals, to an operator to direct a manual controlled-speed movement of the vehicle wheel. The controlled-speed movement may be a rotational movement such as during a wheel alignment rolling compensation procedure, a steering movement, such as during a vehicle wheel alignment angle measurement procedure, or a rotational movement such as during a wheel assembly measurement procedure on a vehicle wheel balancer.

13 Claims, 4 Drawing Sheets

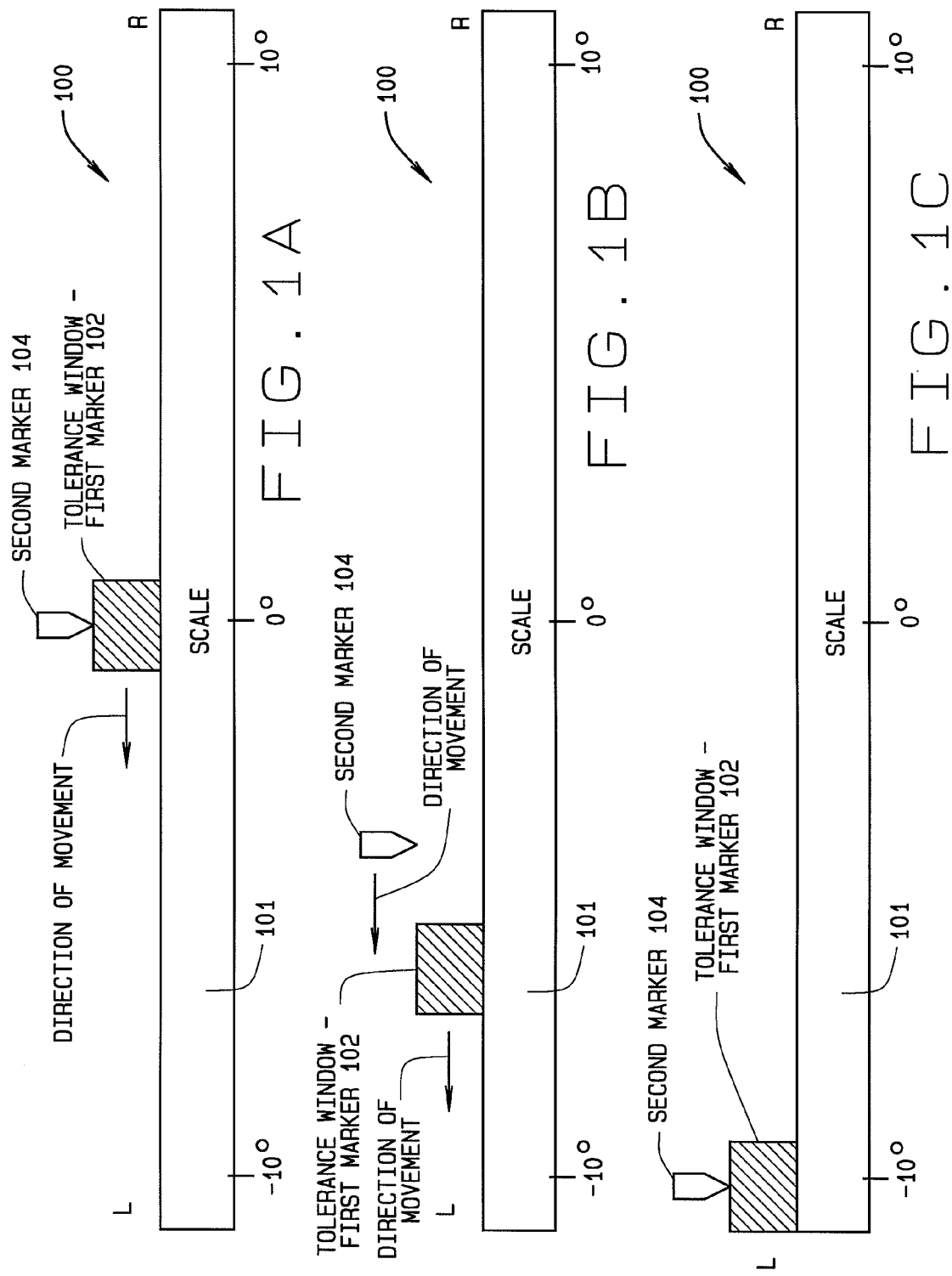

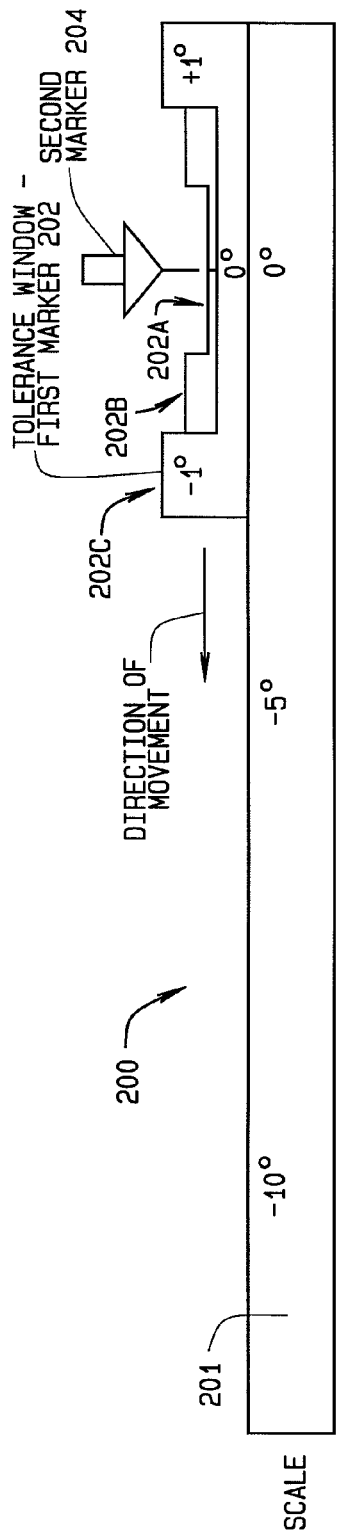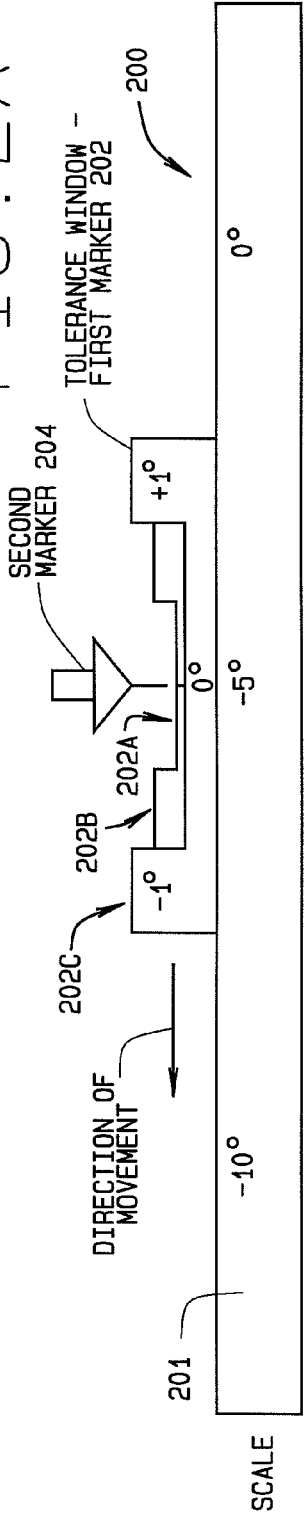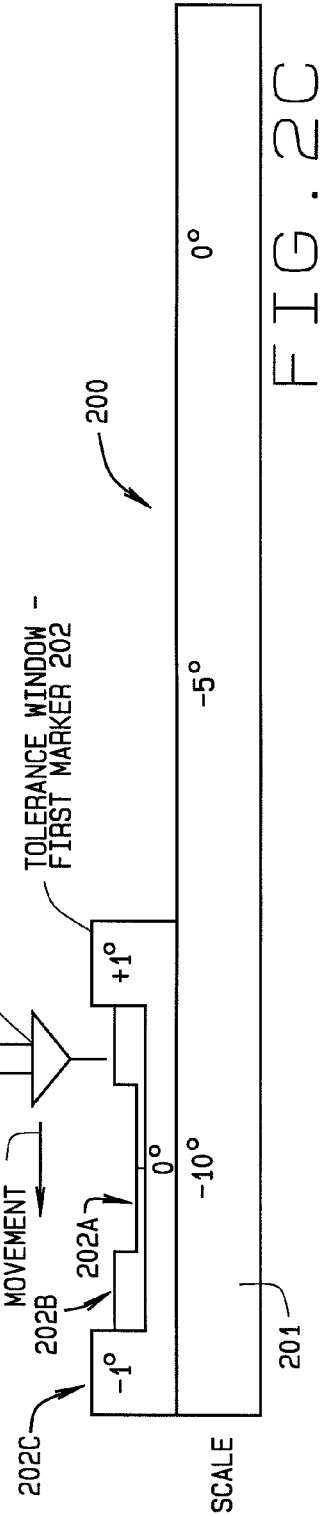

METHOD FOR DIRECTING A CONTROLLED MOVEMENT OF A VEHICLE COMPONENT

CROSS-REFERENCE TO RELATED APPLICATIONS

The present application is related to and claims priority from, U.S. Provisional Application Ser. No. 60/731,752 filed on Oct. 31, 2005, and which is herein incorporated by reference.

STATEMENT REGARDING FEDERALLY SPONSORED RESEARCH

Not Applicable.

BACKGROUND OF THE INVENTION

The present invention relates generally to vehicle wheel service procedures, and in particular, to a method for providing a visual display of information to an operator to direct a manual controlled movement of one or more vehicle wheels or vehicle components.

During a vehicle service procedure, an operator is occasionally required to manually move a vehicle wheel or vehicle component at a controlled speed while measurements are acquired. This movement may be a rolling movement of the entire vehicle, such as during a rolling compensation procedure, steering movement of the steered vehicle wheels, such as during acquisition of vehicle wheel alignment angle relationship data, or rotational movement of a single wheel such as a slow-speed rotation of a wheel assembly on a vehicle wheel balancer during a rim runout procedure. During a vehicle bump steer measurement procedure, an operator may be required to raise and lower the vehicle body, to load and unload the vehicle suspension, at a rate which is suitable for data acquisition.

In each case of controlled movement of a vehicle component, it is generally desirable that the rate of movement fall within a specific tolerance range to enable various associated sensors to acquire sufficient measurement data to complete the procedure. Unguided manual movement of the wheel or component by an operator can be very erratic, and accordingly, it would be advantageous to provide an operator with a visual display to guide the operator to maintain the rate of movement within the tolerance range of the desired movement rate.

For example, during a vehicle wheel alignment process, the operator is occasionally required to carry out steered-wheel alignment angle adjustments for wheel alignment angles which are measured with the vehicle steered in a straight-ahead direction, but which are physically easier to adjust with the wheel in a steered-in or steered-out position. To avoid the necessity of repeatedly returning the steered wheel to the straight-ahead position to check the progress of adjustments, it is necessary to determine a relationship between the alignment angle being adjusted and the vehicle wheel steering angle. For example, measured camber and caster angles vary in relationship to the current steering-angle (toe angle) measurement.

To determine this relationship during a caster angle measurement procedure, it is conventional for a steered wheel of the vehicle to be steered to either the left or right at 10°+/− a predetermined tolerance, or to 20°+/− a predetermined tolerance. The measurements required to calculate the measured caster angle are obtained during a caster steer procedure, and are based on either changes in the camber angle of the wheel or, for some machine-vision based alignment systems utilizing the Schur method of calculating caster, on a minimum of two different images of the wheel or target as the toe angle of the wheel changes. Specification values for camber and caster angles are typically defined only for a specific steering-angle (toe angle), such as 0° toe, or with the steering-angle (toe angle) aligned relative to the vehicle thrust line.

Often it is difficult or awkward for the operator to maintain the vehicle steering in a specified steered location (i.e., 10° or 20°) and access the various suspension components and adjustment points required to complete the necessary alterations. Additionally, during a vehicle wheel alignment adjustment procedure, any steering angle changes are typically made by turning the vehicle steering wheel from the driver's seat position, and not by turning the vehicle wheels directly, resulting in lost time to complete the alignment adjustment procedure, additional physical effort, and an inconvenience to the alignment technician who is required to climb in and out of the vehicle.

For some wheel alignment angle adjustments, the operator is required to initially steer the vehicle wheels to a straight ahead (or 0°) position, or to another predetermined position, from the driver's seat, make the necessary adjustments causing the steered location of the vehicle wheels to change, and then return to the driver's seat to steer the wheels back to the predetermined position to continue making adjustments of the alignment angles. This time consuming process is repeated several times until the adjustments of the alignment angles results in the alignment angles being within specification while the vehicle is steered to the predetermined position.

Furthermore, when the operator turns the steered wheel from the straight-ahead or predetermined position, the measured value for the steering-angle sensitive alignment angle, such as camber or live caster, will change in relationship to the steered angle of the vehicle wheel. If the operator attempts to adjust the steering-angle sensitive alignment angle with the wheel steered away from the straight ahead or predetermined position, using the measured value associated with the straight-ahead or predetermined steered position, the resulting adjustment will be incorrect when the wheel is returned to the straight-ahead or predetermined steered position.

Accordingly, methods for compensating steered-angle sensitive wheel alignment angle measurements for the effects of steering a wheel away from a straight ahead or predetermined measurement position have been developed, such as shown and described in U.S. Published Application No. 2006-0080015 A1 which is herein incorporated by reference, thereby enabling an operator to carry out a vehicle wheel alignment angle adjustment without having to maintain a wheel in a straight-ahead or other predetermined steered condition during an alignment angle adjustment, or requiring the operator to continually return the wheel to the straight-ahead or predetermined position to acquire updated measurements of an alignment angle during the adjustment thereof.

To acquire sufficient measurement data to compensate steered-angle sensitive wheel alignment angle measurements, it is necessary for an operator to steer the vehicle wheels through at least an arc of a minimum range, at preferably a controlled rate of speed suitable for acquisition of measurement data at a desired rate. Different types of vehicle wheel alignment systems will acquire measurement data at different rates. For example, a machine-vision vehicle wheel alignment system may acquire alignment measurement data at a rate which is proportional to the rate at which the system is capable of processing images of the wheels, requiring a slow rate of steer, while a system utilizing gravity-reference angle transducers may have a much higher data acquisition speed, allowing a faster rate of steer. Furthermore, given that different vehicles have different steering gear ratios, different size steering wheels, and different wheel assembly sizes, it is difficult for an operator to consistently steer the vehicle wheels about the required arc at the desired rate of speed.

Accordingly, it would be advantageous to provide an operator with information which facilitates the ability to manually steer the vehicle wheels at the desired rate of speed and in a desired direction over the required steering range. This information may be in any suitable form, such as an audible signal or visual display.

Additional advantages may be achieved by providing an operator with a visual display of information which facilitates the ability to manually roll the vehicle wheels at a desired speed and in a desired direction over a required distance during a vehicle wheel alignment procedure. Either concurrently or alternatively, an audible signal may be provided which varies in a discernable manner, such as in tone, pitch, or volume to indicate a direction and/or speed of movement of the vehicle wheels.

Similar advantages may be realized by providing an operator with a visual display of information which facilitates the ability to manually rotate a vehicle wheel assembly mounted on a vehicle wheel balancer at a desired rotational speed and in a desired direction during a vehicle wheel assembly measurement procedure. Either concurrently or alternatively, an audible signal may be provided which varies in a discernable manner, such as in tone, pitch, or volume to indicate a direction and/or rotational speed of movement of the vehicle wheel assembly.

BRIEF SUMMARY OF THE INVENTION

Briefly stated, the present invention provides a vehicle service system with a dynamic presentation to guide an operator to manually maintain movement of a vehicle wheel within a tolerance range of a desired movement rate. The presentation may be a visual display of information, and audible signal, or a combination of visual and audible signals.

In an embodiment, the present invention provides a method for presenting on a vehicle service system, a dynamic visual display of information to an operator for directing a controlled-speed steer of the steerable wheels of a vehicle over a required steering range.

In an alternate embodiment, the present invention provides a method for presenting on a vehicle service system, information to an operator which is representative of a direction and/or rate at which a vehicle component, such as a steered vehicle wheel is being moved during a measurement procedure.

In an alternate embodiment, the present invention provides a method for presenting a dynamic visual display of information on a vehicle service system to an operator which is representative of a need to increase or decrease the rate of speed at which a vehicle component such as a steered vehicle wheel is being moved or steered during the acquisition of alignment data.

In an alternate embodiment, the present invention provides a vehicle service system with a dynamic visual display of information to an operator which facilitates the operator's ability to manually roll a vehicle wheel at a desired speed and in a desired direction over a required distance during a vehicle wheel alignment procedure.

In an alternate embodiment, the present invention provides a vehicle service system with a method for guiding an operator to manually roll a vehicle wheel at a desired speed and in a desired direction over a required distance during a vehicle wheel alignment procedure.

In an alternate embodiment, the present invention provides a vehicle wheel balancer with a dynamic visual display of information to an operator which facilitates the ability to manually rotate a vehicle wheel assembly mounted on the vehicle wheel balancer at a desired rotational speed and in a desired direction during a vehicle wheel assembly measurement procedure.

In an alternate embodiment, the present invention provides a vehicle wheel balancer system with a method for guiding an operator to manually rotate a vehicle wheel assembly mounted on the vehicle wheel balancer at a desired rotational speed.

In an alternate embodiment, the present invention provides a vehicle service system with a dynamic visual display of information which facilitates an operator to manually move a vehicle component at a desired speed and in a desired direction.

In an alternate embodiment, the present invention provides a method for guiding an operator to manually move a vehicle component at a desired speed and in a desired direction.

The foregoing features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1A is a first embodiment of a visual information display of the present invention illustrating the start of a controlled-speed steer procedure with a vehicle wheel steered straight-ahead;

FIG. 1B illustrates the visual information display of FIG. 1A during the controlled-speed steer procedure as the operator steers the vehicle wheel in the indicated direction;

FIG. 1C illustrates the visual information display of FIG. 1A after the operator has completed the controlled-speed steer procedure to steer the vehicle wheel to a predetermined position;

FIG. 2A is a second embodiment of a visual information display of the present invention illustrating the start of a controlled-speed steer procedure with a vehicle wheel steered straight-ahead;

FIG. 2B illustrates the visual information display of FIG. 2A during the controlled-speed steer procedure as the operator steers the vehicle wheel in the indicated direction;

FIG. 2C illustrates the visual information display of FIG. 2A as the operator completes the controlled-speed steer procedure by steering the vehicle wheel to a predetermined position;

Corresponding reference numerals indicate corresponding parts throughout the several figures of the drawings. It is to be understood that the drawings are for illustrating the concepts of the invention and are not to scale.

DESCRIPTION OF THE PREFERRED EMBODIMENT

Figure 3A:
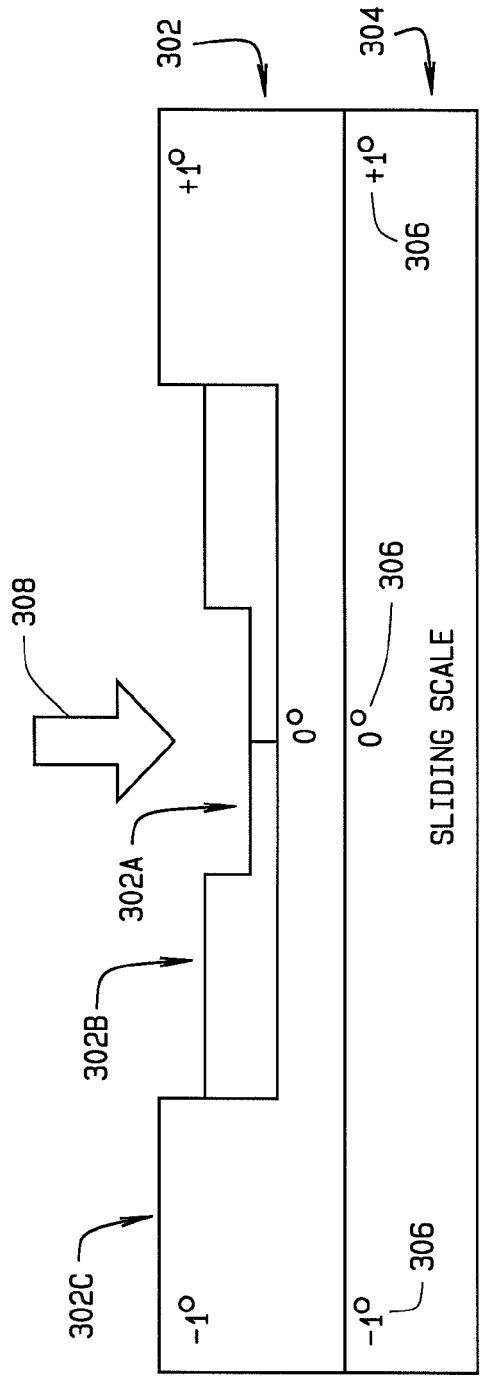
FIG. 3A is a third embodiment of a visual information display of the present invention illustrating the start of a controlled-speed steer procedure with a vehicle wheel steered straight-ahead.

The following detailed description illustrates the invention by way of example and not by way of limitation. The description enables one skilled in the art to make and use the invention, and describes several embodiments, adaptations, variations, alternatives, and uses of the invention, including what is presently believed to be the best mode of carrying out the invention.

During a vehicle service procedure, an operator may be occasionally required to manually move a vehicle wheel at a controlled rate of speed. This movement may be a rolling movement of the entire vehicle, such as during a rolling compensation procedure, steering movement of the steered vehicle wheels, such as during acquisition of vehicle wheel alignment angle relationship data, or rotational movement of a single wheel such as a slow-speed rotation of a wheel assembly on a vehicle wheel balancer during a rim runout procedure. In each case, it is generally desirable that the rate of movement of the vehicle wheel fall within a specific tolerance range to enable various associated sensors to acquire sufficient data to complete the procedure. Unguided manual movement of the wheel by an operator can be very erratic, and accordingly, a vehicle service system of the present invention provides an operator with a visual display to guide the operator to maintain the rate of movement within the tolerance range of the desired movement rate.

The present invention will be described below in the context of a vehicle wheel alignment angle measurement procedure, however, those of ordinary skill in the art will recognize that the present invention may be utilized across a wide range of vehicle service devices such as vehicle wheel alignment systems and vehicle wheel balancer systems, and for a number of different vehicle service procedures such as steering procedures, rolling compensation procedures, and alignment angle measurement procedures. Accordingly, the following description is not intended to limit the method and apparatus of the present invention to only the illustrated embodiment, but rather, is presented as an exemplary embodiment.

It will further be recognized that while the following description is generally directed towards a visual display of information to an operator, information associated with direction and rate of movement of a vehicle wheel may be presented to an operator different forms, such as through the use of audible signals which vary in a discernible manner to convey the intended information.

As described above, various vehicle wheel alignment measurement procedures acquire measurements of vehicle wheel parameters as the vehicle wheel is manually steered through an arc by the operator. The speed with which the vehicle's wheels are turned is preferably controlled by the operator, such that the turn is made at an appropriate speed to enable the recording of a sufficient number of discrete toe angle and camber angle values during the turn. One exemplary method of the present invention for facilitating a speed controlled steer is for a vehicle wheel alignment system to provide a dynamic visual display which is a variation of a steering-angle (toe angle) bar graph, wherein a specification value shown on a bar graph changes over time, requiring the operator to continually steer the vehicle such that a current steering-angle of the vehicle wheel remains within the specification range of the bar graph, or at least does not go beyond the moving specification.

One method of the present invention for facilitating steering of the steered vehicle wheels at a controlled speed requires a vehicle service system to provide a dynamic display of a steering angle measurement which is continually or sequentially altered by adding or subtracting an increasing amount of steering angle (depending on the desired direction of the controlled-speed steering). To maintain the displayed steering angle measurement within a predetermined tolerance range on the display, such as on a steering-angle bar graph, the operator is required to steer the vehicle's wheels at a rate corresponding to the rate at which the displayed steering angle measurement is continually or sequentially altered. If the operator fails to steer the vehicle wheels at the required rate, either by steering too fast or by steering the vehicle's wheels too slow, or by steering in the wrong direction, the displayed steering angle measurement will shift outside the displayed tolerance range, and a suitable warning or indication is provided to the operator.

Turning to FIGS. 1A-1C, a method of the present invention provides a visual representation 100 for facilitating steering of the steered vehicle wheels at a controlled speed. The visual representation 100 illustrates a change in the steering angle specification or the measured steering angle as described above, by displaying a base scale 101 representing a range of steering angles, and a first moving marker 102 to the operator. The first moving marker 102 represents the predetermined tolerance window or range of the measured steering angle, and may be displayed as a simple block. As the controlled-speed steering procedure begins, the first moving marker 102 is moved at a controlled rate across the scale 101 to represent the desired speed and direction of motion for the steered vehicle wheel. A second moving marker 104, representing the current steering angle of the steered vehicle wheel, is displayed in conjunction with the first moving marker 102. To steer the vehicle wheels at the desired speed, the operator is directed to steer the vehicle as required, to maintain the second moving marker 104 within the tolerance defined window or range represented by the first moving marker 102. Optionally, the display of the second moving marker 104 is controlled to change color based on the proximity to the tolerance defined window or range represented by the first moving marker 102. Alternatively, the display of the second moving marker 104 may be controlled to change shape based on the proximity to the tolerance defined window or range represented by the first moving marker 102. To accommodate a wide range of steering angles, the range displayed on the scale 101 may be adjusted as needed to display additional steering range, such as by expanding or contracting to show a zoomed in view (less range) of the steering range or a zoomed out view (more range) of the steering range. Optionally, an audible signal may be provided which varies in a manner which is discernable to an operator in response to relative positions of the moving markers and tolerance windows.

Turning to FIGS. 2A-2C, a method of the present invention provides a visual representation 200 for facilitating steering of the steered vehicle wheels at a controlled speed. The visual representation 200 illustrates a change in the steering angle specification or the measured steering angle as described above, by displaying a base scale 201 representing a range of steering angles, and a first moving marker 202 to the operator. The first moving marker 202 represents the predetermined tolerance window or range of the measured steering angle, and may be displayed as a complex moving bar-graph. The complex moving bar-graph 202 may include representations of different levels of tolerance, such a first tolerance range 202A, a second tolerance range 202B, and a third tolerance range 202C. As the controlled-speed steering procedure begins, the first moving marker 202 is moved at a controlled rate across the scale 201 to represent the desired speed and direction of motion for the steered vehicle wheel. A second moving marker 204, representing the current steering angle of the steered vehicle wheel, is displayed in conjunction with the first moving marker 202. To steer the vehicle wheels at the desired speed, the operator is directed to steer the vehicle as required, to maintain the second moving marker 204 within the various tolerances ranges 202A-202C represented by the first moving marker 202. Optionally, the display of the second moving marker 204 is controlled to change color based on the proximity to the tolerance defined window or range represented by the first moving marker 202. To accommodate a wide range of steering angles, the range displayed on the scale 201 may be adjusted as needed to display additional steering range, such as by expanding or contracting to show a zoomed in view (less range) of the steering range or a zoomed out view (more range) of the steering range. Optionally, an audible signal may be provided which varies in a manner which is discernable to an operator in response to relative positions of the moving markers and tolerance windows.

Figure 3B:
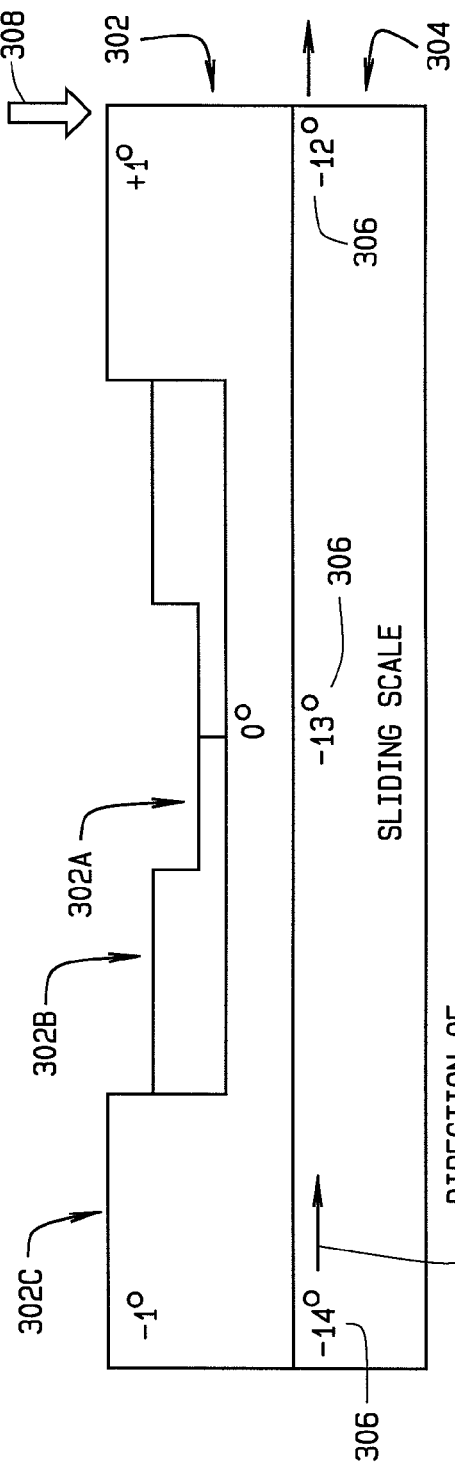
FIG. 3B illustrates the visual information display of FIG. 3A during the controlled-speed steer procedure as the operator steers the vehicle wheel, with displayed angular position values scrolling in the indicated direction.

FIGS. 3A and 3B illustrate an alternate method of the present invention for guiding steering movement of the steered vehicle wheels at a controlled speed by an operator. The method provides a stationary visual representation 302 of the current steering position of the vehicle steered wheels in combination with a sliding scale representation 304 of the desired rate and direction of steering movement. The stationary visual representation 302 is preferably in the form of a complex bar-graph, and may include representations of different levels of tolerance, such a first tolerance range 302A, a second tolerance range 302B, and a third tolerance range 302C. The desired rate and direction of movement may be shown through a combination of moving steering angle numbers, audible signals, graphics, textures, animations, videos, and/or text.

In the embodiment shown in FIGS. 3A and 3B, the numerical steering angle values 306 displayed on the sliding scale representation 304 change to represent the desired rate and direction of steering movement for a vehicle wheel. As the representations 306 of the rate and direction change or scroll, indicated by movement arrows in FIG. 3B, the operator is directed to respond by manually steering the vehicle wheel to counter-act the visual representation of changing or scrolling movement, attempting to maintain a marker 308 representing the position of the steered wheel at the desired optimal position over the stationary visual representation 302 at all times during the procedure. For example, if the operator fails to steer the vehicle wheels, the marker 308 will move relative to the stationary visual representation 302 in the same direction and rate as the sliding scale representation 304. If the operator fails to steer the vehicle wheels at the required rate, either by steering too fast or by steering too slow, the marker 308 will eventually shift outside the predetermined tolerance range 302C, such as shown in FIG. 3B. The rate of change or scrolling of the sliding scale 304 may optionally slow or stop to allow the operator to catch up if the steering movement of the vehicle wheels fall behind the rate of movement directed by the sliding scale 304. Preferably the sliding scale 304 will continue to move until a target steered location is reached, or until the vehicle wheels stop moving at a large steered angle, signifying a steering lock condition. If the position of the steered vehicle wheels as indicated by marker 308 shifts outside the bar graph tolerance ranges, a suitable warning or indication may be provided to the operator.

Figure 4:
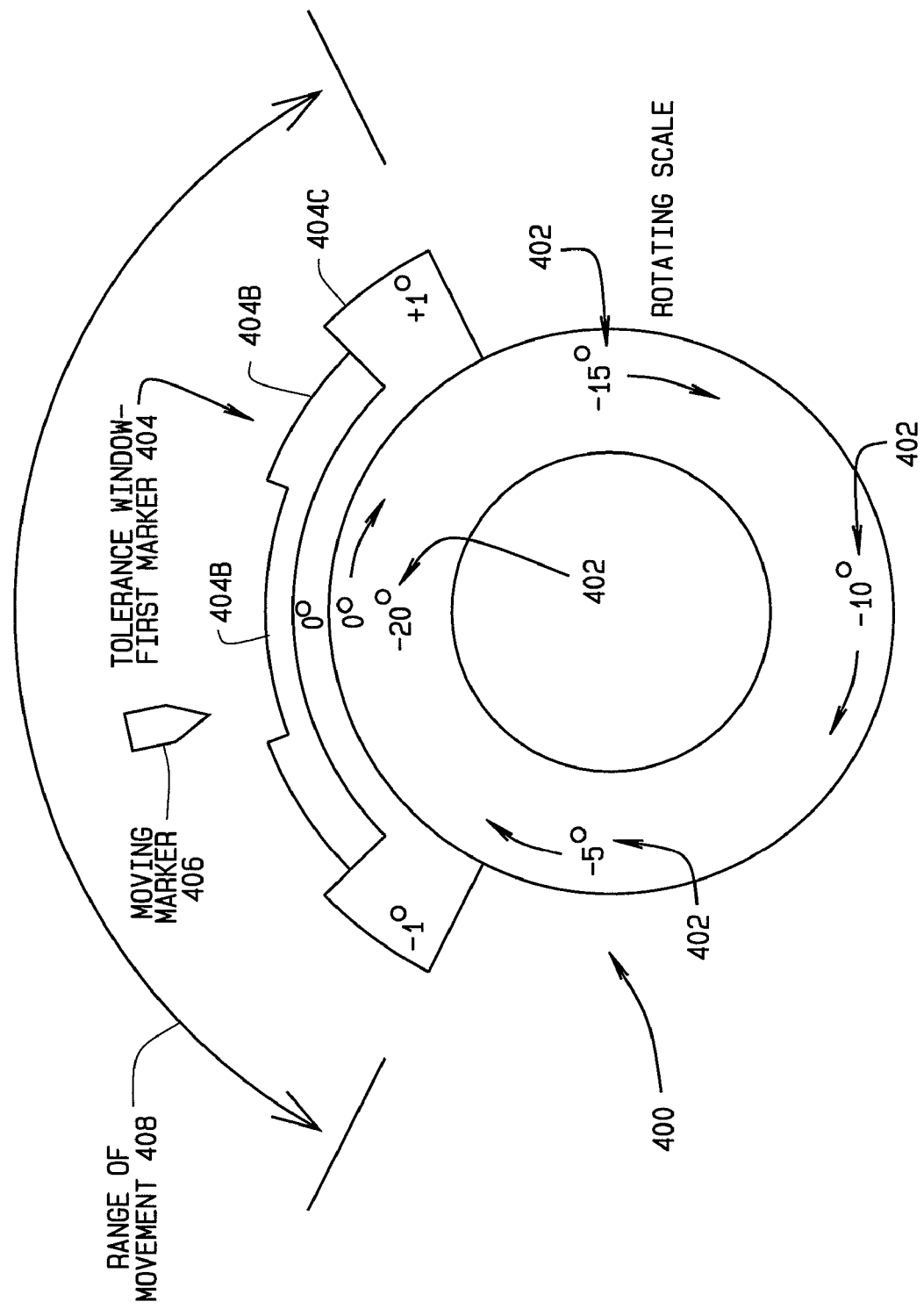
FIG. 4 is a fourth embodiment of a visual information display of the present invention illustrating a controlled-speed steer procedure with a vehicle wheel steered away from the centered position, and with the displayed angular position values rotating in the indicated direction.

While the previously described exemplary methods for providing a vehicle service system with a visual display of the present invention have been described in the context of linear graphs displaying lateral movement, those of ordinary skill in the art will recognize that alternative visual displays are not restricted to linear or lateral illustrations. For example, as shown in FIG. 4, an alternate method of the present invention for facilitating steering of the steered vehicle wheels at a controlled speed is to provide a circular display of information 400, incorporating rotating scale values 402 representative of desired vehicle steering angles, together with a stationary marker 404 representative of one or more tolerance ranges 404A, 404B, and 404C, and a moving marker 406 representative of the current vehicle wheel steering angle or position. In the embodiment shown in FIG. 4, the circular display of scale values 402 rotates clockwise or counter clockwise to show the desired rate and direction of movement. The moving marker 406 is responsive to the position of the vehicle steered wheels to move within an arcuate range 408 defined by of the stationary marker 404. The stationary marker 404 may expand and contract the tolerance windows 404A, 404B, and 404C in relationship to the movement of the marker 406, contracting as the marker 406 moves further away from the intended target position which is represented by the 0 degree variance position at the center of the marker 404. In FIG. 4, the rotating scale 402 is illustrated with negative numbers, but could be illustrated with positive numbers or any combination of moving steering angle numbers, audible signals, graphics, textures, animations, videos, and/or text.

An alternate method of the present invention for facilitating steering of the steered vehicle wheels at a controlled speed is to provide an electronic signal to the vehicle steering system from the alignment equipment to controllably change the steered position of the wheels. The alignment system sends the appropriate signal to the vehicle steering system, such as through a suitable diagnostic communications access point, and controls the steering of the vehicle wheels.

An alternate method of the present invention for facilitating steering of the steered vehicle wheels at a controlled speed is to use an apparatus for effecting the steering control of the vehicle. The alignment system is configured to communicate control signals to the apparatus to controllably steer the vehicle's wheels.

An alternate method of the present invention for facilitating steering of the steered vehicle wheels at a controlled speed is to use an apparatus for directly steering the vehicle wheels. The alignment system is configured to communicate commands to the apparatus to controllably steer the vehicle's wheels. An exemplary apparatus for steering the vehicle wheels is an actuated turnplate. The actuated turnplate may be controlled in such a way as to rotate clockwise and counter-clockwise in response to received commands. The surface of the actuated turnplate has a high friction surface so that the tires do not slip. During operation, the alignment system directs commands to the actuated turnplates to rotate at the desired speed and direction to steer the vehicle wheels.

An alternative method of the present invention for facilitating steering of the steered vehicle wheels at a controlled speed requires adding a component to the visual display for controlling the rate of speed at which the vehicle wheels are steered. For example, the additional visual component may be a button, a drop down menu, a radio button, etc. To reduce the required amount of processing resources, only a portion of the acquired images may be processed during the wheel steering movement. Upon completion of the wheel steering movement, the unprocessed images may be processed to acquire additional measurements for an accurate measurement of the steering movement. Alternatively, the steering speed could be interactively slowed down such that every image is processed, or more images are acquired during the steering movement. Acquiring a greater number of images during a slower steering movement provides a detailed representation of the measurements being taken, and may provide data for use during a diagnostic procedure.

Those of ordinary skill in the art will recognize that the various methods and visual displays illustrated here are not limiting, and that a variety of methods and/or different means to convey direction and rate information, including audible signals, may be utilized to assist or direct the operator through any manual controlled movement of one or more vehicle wheels or components, including rolling compensation procedures, rotational movement of vehicle wheel assemblies mounted to vehicle wheel balancers, and vehicle suspension loading and unloading procedures. For example, during a vehicle bump steer measurement procedure, an operator may be required to raise and lower the vehicle body, to load and unload the vehicle suspension, at a rate which is suitable for data acquisition. By utilizing the disclosed methods and visual displays of the present invention, an operator can be guided to move the vehicle body in the desired direction, and at the desired rate, so that sufficient bump steer measurements can be obtained.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or any other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for presenting a visual display of information to an operator to direct a controlled-speed movement of at least one wheel of a vehicle, comprising:
   presenting a visual display of information to the operator which is representative of a desired direction and a desired rate of movement for the vehicle wheel;
   moving said at least one vehicle wheel in response to said presented visual display;
   monitoring said direction and rate of movement of said at least on vehicle wheel;
   altering said presentation of said visual display of information at least in response to said monitored direction deviating from said desired direction or in response to said monitored rate of movement deviating from said desired rate of movement by a tolerance amount;
   during said movement of said at least one vehicle wheel, acquiring a plurality of discrete measurements associated with said at least one vehicle wheel; and
   wherein said vehicle wheel is a steerable vehicle wheel, wherein said controlled-speed movement is a steering movement of said vehicle wheel over an arcuate range, and wherein said plurality of discrete measurements are wheel alignment angle measurements.

2. The method of claim 1 wherein said step of altering said presentation of said visual display of information to the operator indicates a need to alter the rate of movement at which said vehicle wheel is moved.

3. The method of claim 2 further including the step of varying a color in said visual display in response to said need to alter the rate of movement for said vehicle wheel.

4. The method of claim 1 wherein said desired rate of movement for the vehicle wheel is selected in response to a type of sensor system utilized to acquire said plurality of discrete measurements.

5. A method for presenting a visual display of information to direct a controlled-speed movement of at least one wheel of a vehicle, comprising:
   providing a first visual representation of a desired position for said at least one wheel;
   providing a second visual representation of a current position for said at least one wheel in relation to said first visual representation;
   changing said first visual representation within said visual display;
   wherein said change of said first visual representation is representative of both a desired movement rate and a movement direction for a controlled-speed movement of said at least one wheel from said current position to said desired position;
   acquiring a plurality of discrete measurements associated with said at least one vehicle wheel during said controlled-speed movement of said at least one vehicle wheel; and
   wherein said vehicle wheel is a steerable vehicle wheel, wherein said controlled-speed movement is steering movement of said vehicle wheel over an arcuate range, and wherein said plurality of discrete measurements are wheel alignment angle measurements.

6. The method of claim 5 further including the step of providing a visual representation of a tolerance associated with said first visual representation; and
   varying said second visual representation responsive to proximity of said second visual representation to said represented tolerance.

7. The method of claim 5 wherein said change is a steering movement, and wherein said desired movement rate is a desired rate of change in a steering angle associated with said at least one wheel during steering movement from said current position to said desired position.

8. A method for presenting a visual display of information to an operator to direct a controlled-speed movement of at least one vehicle wheel, comprising:
   providing a first visual representation of a desired position for said at least one vehicle wheel;
   providing, relative to said first visual representation, a second visual representation of a current position for said at least one vehicle wheel; and providing a third visual representation of a tolerance within which said second visual representation should remain during said controlled-speed movement;

changing said first visual representation within said visual display;

wherein said change of said first visual representation is representative of at least a desired rate of movement and a direction of movement for a controlled-speed movement of said at least one vehicle wheel;

acquiring a plurality of discrete measurements associated with said at least one vehicle wheel during said controlled-speed movement of said at least one vehicle wheel; and wherein said vehicle wheel is a steerable vehicle wheel, wherein said controlled-speed movement is a steering movement of said vehicle wheel over an arcuate range, and wherein said plurality of discrete measurements are wheel alignment angle measurements.

9. The method of claim 8 wherein said controlled-speed movement of said at least one vehicle wheel is associated with a vehicle wheel alignment rolling compensation procedure.

10. The method of claim 8 wherein said controlled-speed movement of said at least one vehicle wheel is a steering movement.

11. The method of claim 8 wherein said movement of said at least one vehicle wheel is associated with a vehicle wheel measurement procedure.

12. The method of claim 11 wherein said vehicle wheel measurement procedure is a rim runout measurement procedure.

13. The method of claim 11 wherein said vehicle wheel measurement procedure is a wheel balance measurement procedure.

* * * * *